April 1, 1947. R. M. HAFF 2,418,226
REGISTERING FRAME AND NEGATIVE CARRIER FOR ENLARGING
Filed July 18, 1944 2 Sheets—Sheet 1
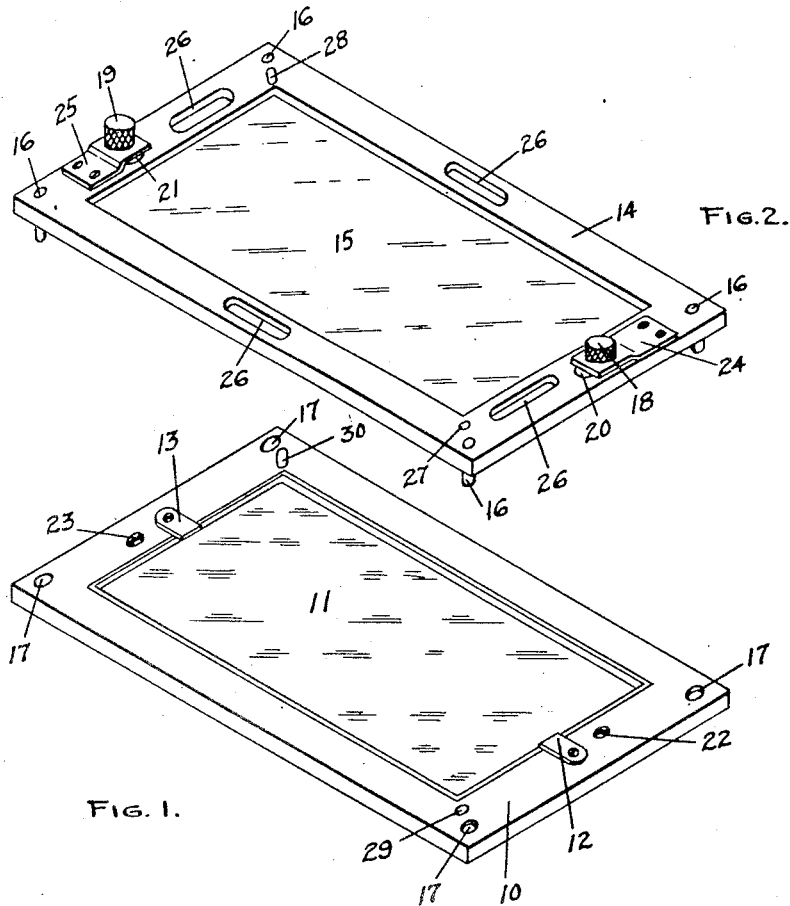
INVENTOR.
Richard M. Haff.
BY
ATTORNEYS.

INVENTOR.
Richard M. Haff.
ATTORNEYS.

Patented Apr. 1, 1947

2,418,226

UNITED STATES PATENT OFFICE 2,418,226

REGISTERING FRAME AND NEGATIVE CARRIER FOR ENLARGING

Richard M. Haff, Binghamton, N. Y., assignor to General Aniline & Film Corporation, New York, N. Y., a corporation of Delaware Application July 18, 1944, Serial No. 545,447

7 Claims. (Cl. 88—24)

This application pertains to a negative carrier for photographic enlargers and to a registering frame by means of which the negatives are perforated after having been registered. Extreme accuracy is required when printing from color separation negatives, and that is especially true when projection printing methods are employed. The greater the scale of enlargement, the more inaccuracies in registering or printing are magnified. Accordingly, it is a general purpose of the device herein described and claimed to provide for accurate registering of negatives to be printed, perforation of these negatives so that they may be separately handled in the subsequent printing, and the construction of a negative carrier to hold each of the separate perforated and registered negatives in the identical relative position in which all of the others of the series are held during the printing or enlarging operation.

Enlarging in color work differs from the same process as applied to black and white photography in that a plurality of negatives known as color separation negatives must be independently projected on to the enlarging paper, for example, Ansco color paper. In most all instances, at least three such negatives must be made and separately projected, each with its own particular color of light.

For accomplishing that purpose in the typical projection printer or enlarger now available, the invention of the instant case provides a simple registering and perforating frame such as may be easily employed by those reasonably skilled in photographic work and which is especially adapted to use with smaller negatives such as are more likely to be involved if enlarging is to be done rather than contact printing. In place of the usual negative carrier adapted to position a negative for black and white rather than color printing, an adapter and negative holder hereinafter more specifically described, are to be used. The adapter is provided with means by which it is fixedly positioned in the proper plane between the light source and enlarger lens. It is also so constructed as to permit easy insertion and withdrawal of the negative holder and also for retaining that negative holder in an identical, predetermined relationship to the adapter upon each reinsertion thereof. The negative holder is provided with transparent or translucent plates between which the negative to be printed is clamped and also with positioning means by which a registered, perforated negative may be located at the precise relative position it should occupy in order to be projected on to the enlarging paper in substantially perfect registry with the image projected from each of the other negatives of that series. The negative holder is so constructed that one side thereof cooperates with a positioning abutment or shoulder on the adapter and has a notch engageable by other means on the adapter whereby the holder is always clamped in the identical position after its removal and reinsertion.

The invention is described herein by reference to a specific embodiment of the same as illustrated in the accompanying figures of drawing wherein:

Fig. 1 is an isometric view of the base member of the registering frame.

Fig. 2 is an isometric view of the cooperating cover member.

Fig. 3 is a detail of one type of punch employed with the frame.

Fig. 4 is a detail of another punch adapted to making a circular hole rather than an elongated hole as with the punch shown in Fig. 3.

Figure 5:
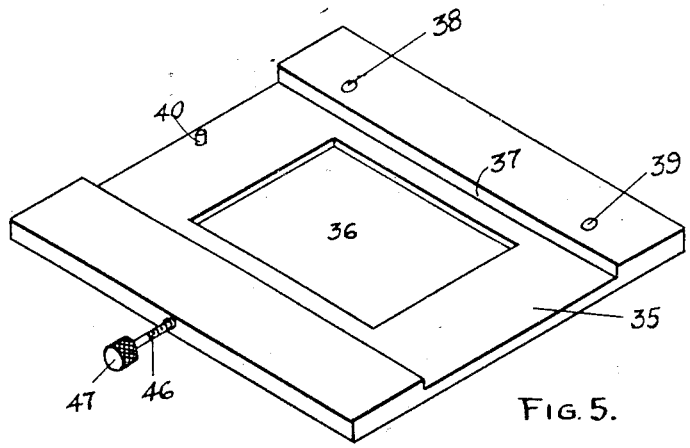
Fig. 5 is an isometric view of the negative carrier, adapter member.

Now referring to the Figs. 1 and 2, the registering frame consists of two cooperating parts each having a transparent or translucent window between which the negative or negatives to be punched or registered are clamped and by means of which light projected from the opposite side of the frame and negatives will serve to illuminate them so that the images thereon may be brought into accurate registration. The frame includes, among other parts, a base 10 at the upper side of which is inserted a window 11 retained by means of the clips 12 and 13. The window preferably is set so that its top surface projects slightly above the surface of the frame itself, and the clips 12 and 13 engage within beveled notches so that they are entirely beneath the top surface of the window.

The cover member includes a frame 14 in which a window 15 similar to the window 11 is set, said window projecting below the lower surface of frame 14 and being retained in the same or another convenient manner. Frame 14 has at each corner, or at least at two spaced points, dowel pins 16 which are accurately engageable within the holes 17 in frame 10. These pins assure accurate positioning of the cover member over the base member after each removal of the same and also assure accurate registration of the punch guiding openings and the cooperating die openings in the base. The cover is held in position above the base or may be drawn down for clamping a negative or negatives between the windows 11 and 15 by means of two screws 18 and 19, each of which has a knurled head and a collar, the latter being indicated by numerals 20 and 21. These screws engage within tapped holes 22 and 23 in the base and may serve to hold the cover slightly raised from the base during manipulation of the negatives to bring them into registration, or may serve to draw the cover down for temporarily clamping the negatives in position while the perforations are punched in them. Clips 24 and 25 engage beneath the knurled heads of the screws but above the collars 20 and 21, and thereby retain them in proper position for effecting either of the above-mentioned results.

The frame 14 of the cover member is slotted or apertured at 26 so that edges of the negatives may be reached for moving them in the appropriate direction while effecting their registration. The cover member actually acts as a template by means of which the punches are positioned. For that purpose a circular opening 27 at one corner and an elongated opening 28 at the opposite corner align with similar die openings 29 of circular cross section and 30 of elongated section in the base member, Fig. 1.

In Figs. 3 and 4 the punches are shown, one being of circular section and the other elongated correspondingly to the openings 28 and 30. The elongated punch indicated at numeral 31 has a handle 32 while the circular punch has a similar handle 34. These punches are accurately ground and have only a working clearance in the openings provided for them in the cover and base members.

Now referring to Fig. 5, the negative carrier adapter member consists of a rectangular element 35 which has a central opening 36 slightly larger than the negative to be projected. This adapter is centrally grooved or undercut so as to provide shoulder 37 against and by which one side of the negative holder itself may be accurately positioned. This adapter member is to be retained within the enlarger by any convenient locating means such as pins engageable with the holes 38 and 39, or by positioning stops and spring pressure. Of course, the actual size and shape of this adapter member will vary with the design of the particular enlarger with which it is to be used. The means for retaining it in that enlarger will also vary according to that design. In certain instances it may be clamped from the side, but the object is to retain it fixedly in a position in which the negative within the cooperating holder will be in the intended position for proper projection of its image on the enlarger paper. It must not be allowed to change position as the enlarger is manipulated or as the negative holder is withdrawn and reinserted.

A pin 40 serves as a limiting stop and for roughly locating the negative holder when the same is inserted. Final position of the holder does not, however, depend upon that pin.

Figure 7:
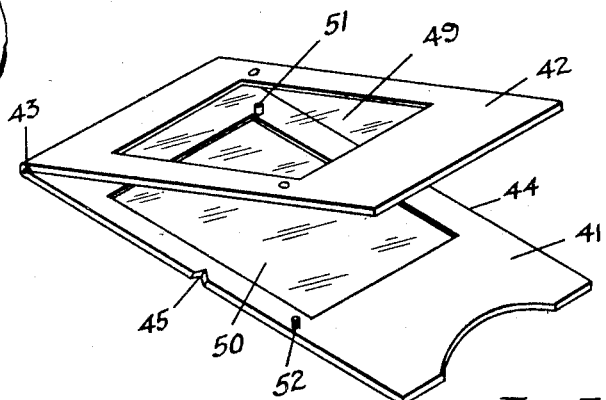
Fig. 7 is an isometric view of the negative holder.

In Fig. 7 the negative holder includes two plate members 41 and 42 hinged at 43. The hinge 43 is relatively loose, that is, allows a slight movement of plate 42 with respect to 41. The plate 41 is the one by which the negative is actually laterally positioned, also the one by means of which the holder is retained in predetermined position within the adapter. For that latter purpose, edge 44 of plate 41 is accurately ground to cooperate with the shoulder 37 in the adapter member. A notch 45 is engaged by the end of clamping screw 46, Figs. 5 and 6. That clamping screw has a knurled head 47 by means of which it is adjusted and a tapered end 48 which projects within the notch 45. It can thus be seen that the plate 41 of the holder will always be located in an identical, predetermined position with respect to the adapter member by sliding the holder into the adapter until it engages stop 40, then tightening the clamping screw 46 whereupon the point 48 will force plate 41 tightly against shoulder 37 and will also locate it at a definite position along the abutment or shoulder 37. The actual construction is such that upon tightening the screw 46, the plate is drawn back slightly away from the stop pin 40.

Again referring to Fig. 7, the holder is preferably provided with translucent windows 49 and 50 between which the negative is to be clamped. These windows are commonly employed in negative holders and their construction and mode of retention need not be described in detail here. Adjacent opposite corners of the window 40, and set in plate 41, are pins 51 and 52. These pins are so positioned as to engage the perforations formed when the registered negatives were punched in the frame above described. The pin 51 engages the circular opening formed by punch 33 and is of the exact diameter to fit that opening. The pin 52 may be of circular cross section or of square or elongated section so long as its width is the same as that of punch 31 and so long as it is not as long as the elongated opening made by that punch. In other words, there must be a clearance at either end of the elongated opening so that it is not necessary to space the pins 51 and 52 exactly as the die openings 29 and 30 are spaced. This construction also takes care of shrinkage in the negatives, that being something which is practically unavoidable. Plate 42 has clearance holes within which the pins 51 and 52 project when the holder is closed. Preferably the plate 42 is not quite so wide as plate 41, however, that is not important so long as the edge 44 of plate 41 is the only surface contacting shoulder 37, and also so long as the edge of plate 42 is not contacted by the adjusting or clamping screw 46.

The device is open to variations which may be apparent after access to this disclosure. If an enlarger is to be built having in mind the enlargement of color pictures, the adapter member may accordingly be constructed as an integral part of the enlarger rather than as an attachment or accessory for use therewith. In that event, the negative holder receiving means within the enlarger will be the equivalent of the adapter described here. Of course, black and white printing may still be done using the negative holder intended for color work or a differently constructed holder not having provision for accurate placement of a series of color separation negatives.

Instead of perforating the negatives at diagonally opposite corners, they may be perforated at one side in which event the registering frame and the locating pins on the negative holder will be changed in position accordingly.

Instead of a threaded instrument for engaging the notch 45 in the holder, a spring pressed detent may be substituted, or some other similar stop means may be employed which will position the negative holder in one relative direction in cooperation with the positioning effected by the shoulder 37. In fact, a reversal of parts may be employed in which the positioning notch is to be a part of the adapter, and the engaging element for entering that notch will be associated with the holder.

Figure 6A:
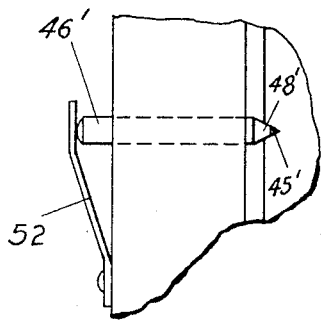
Fig. 6a shows a modification.
Figure 6:
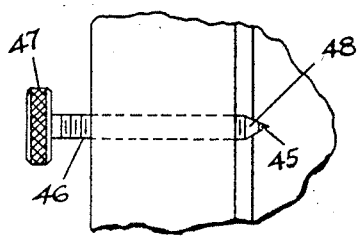
Fig. 6 is a detail view showing the manner in which the holder is retained within the adapter.

As shown in Fig. 6a, a detent 46' may be pressed into engagement with the notch 45' by a spring such as the leaf spring 52. The detent may have a point 48' similar to that of the screw 46.

*Operation*

It is to be assumed that color separation negatives have been made according to some one of the accepted methods. These negatives may or may not have indexing or registration marks thereon, and accordingly, registration will be effected by bringing the marks into coincidence or by bringing the images into proper registration. One of the negatives is first placed on the glass plate 11 and should be taped in position by using some thin, transparent type of adhesive tape. The cover is then placed over the base member of the registering frame, clamped down by using the screws 18 and 19, and that negative then perforated using the punches 31 and 33. The cover is then raised away from the base member and a second negative superimposed upon the first. The cover member should be held away from contact with the negatives, or at least, should not interfere with the manipulation of the second negative so long as it is being moved to effect registration. The openings 26 assist in this function, and pointed instruments of any convenient type may be used. When the image on the second negative is brought into exact coincidence with that on the first, the cover is again clamped in position to retain that registration and the second negative may then be perforated.

The second negative is then removed and the third treated in like manner, and this is continued with as many negatives as are to be printed for that particular picture. When completed, they are laid aside and properly marked or arranged so as to be printed in predetermined sequence and with the appropriate color of light for each. during the registering, the frame should be illuminated from the under side of the window 11 and, if desired, magnifying means can be employed to effect greater accuracy. Magnifying means is also desirable for eliminating errors due to parallax.

Assuming that the adapter has been mounted in the enlarger, and that the enlarger is otherwise in readiness for printing the negatives, the first is placed in the holder by engaging the circular perforation over the circular pin 51. Then the elongated opening is pressed down over pin 52 after which the plate 42 may be lowered thereby sandwiching the negative flatly between the glass plates 49 and 50. The holder is then carefully slid into the adapter until it stops at the pin 40. The screw 46 is then tightened, thereby pressing the holder up against shoulder 37 and positioning it so that the negative may be printed by projecting light rays through it and on to color printing paper at the projection board. Each negative is handled in the same way and, of course, the appropriate color of light is used for it. So long as reasonable care is exercised, each of the negatives will have its image printed on the color paper and the result will be a single sharply defined color picture. Care should be exercised so that rough handling does not displace any of the components of the enlarger itself in which event one or more of the images may be printed out of registration.

In certain of the claims, for the interengagement between the elements by which the holder is positioned longitudinally of the adapter, the term "complementary" has been employed. The preferred form which the engaging surfaces may take is illustrated in the case, but it is to be understood that other shapes may be adopted either for the notch or for the element which engages within the notch. The term "complementary" should be understood as designating any cooperating instrumentalities by which surface contact is obtained, that surface contact being of such a nature as to position the holder at a definite predetermined longitudinal position relative to the adapter upon each reinsertion of the same within the enlarger.

While one embodiment of the invention has been disclosed, it is to be understood that the inventive concept may be carried out in a number of ways. This application is thereby not to be limited to the precise details described but is intended to cover all variations and modifications thereof falling within the spirit of the invention and the scope of the claims.

I claim:

1. A negative retaining and positioning means for photographic enlargers including in combination, a negative holder and an adapter, said adapter having a positioning shoulder at one side of a central opening through which light may be projected through a negative, a positioning screw at the opposite side of said adapter having a conically shaped point, said holder being constructed of two hinged plates, one of which is provided with positioning means for the negative and with an edge engageable by the shoulder on the adapter and a notch within which the point of the positioning screw may engage.

2. A negative retaining and positioning means for photographic enlargers including in combination a negative holder, means insertable within an enlarger for receiving said holder and having means by which it may be positively and precisely positioned therein, and cooperating means associated with both the holder and receiving means for locating the holder in an identical position upon each reinsertion in the receiving means, said locating means including an edge on the holder, a shoulder on the receiving means against which said edge may be pressed, a notch in the holder and means having a notch engaging end of shape complementary to that of the notch for engaging said notch, thereby to press the said edge against the shoulder and simultaneously to determine the longitudinal position of the holder.

3. A negative retaining and positioning means for photographic enlargers including in combination a negative holder, means for receiving said holder within an enlarger, said means having definite and precise location relatively thereto, and cooperating means between the holder and receiving means for locating the holder at a definite predetermined position therein upon each reinsertion thereof, said means including an edge on the holder, a shoulder on the receiving means against which said edge may be pressed, a V-shaped notch in the holder and means for engaging said notch including a pointed instrumentality movable to and from the notch for pressing the holder into a position so that the said edge will bear against the shoulder and at the same time determine a single definite position therefor lengthwise of the shoulder.

4. A negative retaining and positioning means for photographic enlargers including in combination, a negative holder and an adapter, said adapter having means by which it may be engaged by positioning elements forming a part of an enlarger and by which it will be positively and precisely located therein, a shoulder at one side of a central opening in said adapter, a positioning screw at the opposite side of said adapter having a conically shaped point, said holder having therein means for definitely retaining a negative in a predetermined position, an edge engageable with the shoulder in the adapter, and a notch at the side opposite said edge so shaped as to receive the pointed end of the screw whereby when inserted in the adapter and pressed into position by tightening said screw, the holder will always assume identically the same position.

5. A negative retaining and positioning means for photographic enlargers including in combination, a negative holder, means insertable within an enlarger for receiving said holder, and cooperating means associated with both the holder and receiving means for locating the holder in an identical position upon each reinsertion thereof, said means including an edge on the holder, a shoulder on the receiving means against which said edge may be pressed for locating the holder laterally, a notch in the holder at the side thereof opposite said edge, and means for engaging said notch for pressing the holder edge into contact with the shoulder of the receiving means, said means for engaging the notch also being complementary thereto, thereby to determine the longitudinal position of the holder.

6. A negative retaining and positioning means for photographic enlargers including in combination, a negative holder and an adapter, said adapter having means for engagement with positioning elements forming a part of an enlarger, thereby positively to fix its position, a shoulder at one side of the adapter and a positioning screw at the opposite side, said negative holder having one edge for abutting against said shoulder when pressed in that direction by said screw, said negative holder having at its opposite edge a notch for engagement by said screw, that end of the screw which engages the notch having such shape that upon repeated engagement thereby the surface contact between it and the notch shall be such as to position the holder at a definite, predetermined, longitudinal position relative to the adapter.

7. A negative retaining and positioning means for photographic enlargers including in combination a negative holder, means insertable within an enlarger for receiving said holder, said means having positioning elements for engagement with cooperating means in an enlarger whereby it may be definitely and precisely positioned therein, and cooperating means associated with both the holder and receiving means for locating the holder in precisely the same position upon each reinsertion thereof, said means including a positioning surface on the holder, a cooperating abutment on the receiving means against which said positioning surface may be pressed for determining its position in one direction, and cooperating interengaging means including a notch-like indentation in one of the members and an adjustable instrumentality in the other having an end of a shape complementary to that of the notch-like indentation and being movable in a direction to press the said positioning surface on the holder into engagement with the abutment on the receiving means and simultaneously to position the holder in a direction at right angles to the said one direction.

RICHARD M. HAFF.

REFERENCES CITED

The following references are of record in the file of this patent:

UNITED STATES PATENTS

| Number | Name | Date |
|---|---|---|
| 1,820,880 | Crehore | Aug. 25, 1931 |
| 1,377,511 | Novothy | May 10, 1921 |
| 1,620,343 | Hacker | Mar. 8, 1927 |
| 2,207,211 | Worlatschek | July 9, 1940 |
| 2,249,228 | Rogers | July 15, 1941 |
| 2,266,908 | Rogers | Dec. 23, 1941 |
| 1,944,561 | Kronschnabl | Jan. 23, 1934 |
| 2,192,924 | Maher et al. | Mar. 12, 1940 |
| 2,251,184 | Bohannon | July 29, 1941 |
| 2,153,159 | Schubert | Apr. 4, 1939 |
| 2,303,920 | Drucker | Dec. 1, 1942 |
| 761,945 | Cherrill | June 7, 1904 |
| 2,263,025 | Young, Jr., et al. | Nov. 18, 1941 |
| 2,260,672 | Johanson | Oct. 28, 1941 |

FOREIGN PATENTS

| Number | Country | Date |
|---|---|---|
| 337,067 | French | Oct. 29, 1903 |